(12) United States Patent
Schreiner et al.

(10) Patent No.: US 12,570,152 B2
(45) Date of Patent: Mar. 10, 2026

(54) METHOD FOR CONTROLLING THE OPERATION OF AN ELECTRIC MACHINE OF A MOTOR VEHICLE

(71) Applicant: ZF FRIEDRICHSHAFEN AG, Friedrichshafen (DE)

(72) Inventors: Cedric Schreiner, Würzburg (DE); Volker Grimm, Würzburg (DE); Florian Ullrich, Gerolzhofen (DE); Günter Fambach, Schonungen (DE); Manuel Schwab, Friedrichshafen (DE); Thomas Wolf, Auerbach (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 90 days.

(21) Appl. No.: 18/294,451

(22) PCT Filed: Jul. 26, 2022

(86) PCT No.: PCT/EP2022/070883
§ 371 (c)(1),
(2) Date: Feb. 1, 2024

(87) PCT Pub. No.: WO2023/011974
PCT Pub. Date: Feb. 9, 2023

(65) Prior Publication Data
US 2024/0286489 A1 Aug. 29, 2024

(30) Foreign Application Priority Data
Aug. 4, 2021 (DE) .................... 10 2021 208 442.7

(51) Int. Cl.
*B60L 3/00* (2019.01)

(52) U.S. Cl.
CPC ................................. *B60L 3/0061* (2013.01)

(58) Field of Classification Search
CPC .. B60L 3/0061; B60L 3/00; H02P 3/22; H02P 29/024
USPC .......................................... 701/22
See application file for complete search history.

(56) References Cited

U.S. PATENT DOCUMENTS

2016/0375774 A1* 12/2016 Lauter ...................... B60L 3/04
318/400.22
2017/0313193 A1* 11/2017 Grossmann ............... H02P 3/22

FOREIGN PATENT DOCUMENTS

DE 102013016960 7/2014
DE 102013213044 1/2015

OTHER PUBLICATIONS

Office Action of corresponding German Patent Application No. DE 10 2021 208 442.7.

* cited by examiner

*Primary Examiner* — Shardul D Patel
(74) *Attorney, Agent, or Firm* — COZEN O'CONNOR

(57) ABSTRACT

Method for controlling the operation of an electric machine of a motor vehicle comprising the following: detection of a fault condition; bringing the electric machine into one of at least two fault operation modes in which the electric machine generates a torque below a maximum torque particularly so as to be torque-free. The fault operation mode is selected depending on the value of a detected current through an electric or electronic component part associated with the electric machine.

9 Claims, 2 Drawing Sheets

METHOD FOR CONTROLLING THE OPERATION OF AN ELECTRIC MACHINE OF A MOTOR VEHICLE

CROSS REFERENCE TO RELATED APPLICATIONS

This is a U.S. national stage of Application No. PCT/EP2022/070883 filed Jul. 26, 2022. Priority is claimed on German Application No. DE 10 2021 208 442.7 filed Aug. 4, 2021, the content of which is incorporated herein by reference.

BACKGROUND OF THE INVENTION

1. Field of the Invention

The disclosure is directed to a method for controlling the operation of an electric machine of a motor vehicle.

2. Description of the Related Art

Methods for controlling the operation of electric machines in motor vehicles are known in principle from the prior art. In these methods, in particular, fault conditions of the electric machine or of a control device used for controlling the electric machine can be detected. If such a fault condition is detected, there are known routines by which the electric machine or motor vehicle, respectively, is to be brought to a safe state. In such a safe state, there should be no risk proceeding from the electric machine, i.e., in particular, no risk that the torque generated by the electric machine will be limited.

In other words, when a fault condition occurs the electric machine can be prevented from generating an uncontrolled torque which could be transmitted to the drivetrain of the motor vehicle and which could cause a potentially unsafe driving situation. A number of methods are known for enabling the electric machine to be operated in the safe state. For example, an active short circuit state or a freewheeling state can be used to ensure that the electric machine remains in a safe state during the detected fault condition.

However, the individual known methods have strengths and weaknesses depending on an actual operating point of the electric machine. Therefore, utilizing one method throughout the entire operating range of the electric machine is inefficient or can lead to uncomfortable secondary effects or can damage components in the electric machine or control device, particularly electronic components in an inverter.

SUMMARY OF THE INVENTION

The problem on which the invention is based is to provide an improved method for controlling the operation of an electric machine in a motor vehicle.

As was described above, the disclosure is directed to a method for controlling the operation of an electric machine of a motor vehicle. The disclosure is based on the insight that the method comprises the detection of a fault condition and bringing the electric machine into one of at least two fault operation modes. In the fault operation modes, the electric machine generates a torque below a maximum torque and can be set torque-free, in particular, i.e., the electric machine does not generate any torque or transmit any torque to an output of a gear unit mechanism. The fault operation mode is advantageously selected depending on a detected current through an electric or electronic component part associated with the electric machine.

In other words, for the fault operation modes, a maximum torque can be defined that is the maximum which the electric machine may still deliver after the fault condition is detected and the electric machine has been brought into one of the at least two fault operation modes. In so doing, an adjustment or determination can be made to the effect that no torque is generated or transmitted by the electric machine, but a determined range of variation or safety range can be provided such that the electric machine can nevertheless generate comparatively small torques, particularly less than 5 Nm.

The choice of which of the at least two fault operation modes is selected after detection of the fault condition or in the course of operation of the motor vehicle after detection of the fault condition depends on a detected current value. To this end, the value of a current through an electric or electronic component of the electric machine or of a device associated with the electric machine, particularly a component part of the inverter, can be detected, for example, by a suitable sensor or derived by a control device associated with the electric machine. The electric or electronic component can be directly part of the electric machine or can be part of a component or device associated with the electric machine. For example, the electric or electronic component can be a component part of a control device, particularly an inverter.

In other words, the invention suggests that the value of current through an electric or electronic component is detected and, depending on the current value that is actually detected, a choice can be made between the at least two fault operation modes. In particular, a first fault operation mode can be selected with a first current value or with a current value in a first interval, and a second fault operation mode can be selected with a second current value or with a current value in a second interval. Accordingly, the method suggests the initial choice of fault operation mode, i.e., that the fault operation mode can be selected depending on the current value when the fault condition is detected, and, in addition, in further operation of the motor vehicle, it can be checked continuously or in fixed time intervals or in an event-based manner whether it is advantageous to change the fault operation mode. To this end, the current value can be correspondingly detected and a potential change to another fault operation mode can be evaluated based on the detected current value.

The method can be further developed in such a way that a current limit is defined and the detected current value is compared with the defined current limit, and the choice of the fault operation mode is made depending on a position of the current value in relation to the current limit. In other words, based on the current limit, a limit can be defined which delimits the operating ranges of the electric machine in relation to one another. Accordingly, operating ranges of the electric machine which are best suited to the individual fault operation modes are delimited relative to one another by the defined current limit. Therefore, a determined operating range of the electric machine, which can be selected based on the current value can be provided for each fault operation mode.

In other words, the detected current value can be used to check for the operating range in which the electric machine is actually being operated and, therefore, to select which one of the at least two fault operation modes is better suited for operating the electric machine during the fault condition.

The position of the current value relative to the current limit can be determined in any number of ways in principle, for example, by subtraction or by checking whether the current value exceeds the current limit or falls below it. When the current value adopts the current limit, i.e., when the current value is the same as the current limit, it can be associated with exceeding or falling below as demanded by the operating strategy or the individual fault operating modes.

With respect to the method, it can be further provided that a first fault operation mode is implemented when a current value below the defined current limit is detected and a second fault operation mode is implemented when a current value above the defined current limit is detected. Therefore, a first fault operation mode can be selected below the current limit, i.e., when the detected current value is less than the defined current limit, and a second fault operation mode can be selected above the current limit, i.e., when the detected current value is greater than the defined current limit. As was described above, a special case in which the current value exactly corresponds to the current limit can be associated either with the first fault operation mode or with the second fault operation mode.

As has already been described, the current limit can be defined in any number of ways in principle. For example, the current limit can already be in the range of 0 A, which means that the second fault operation mode is selected when current flows through the electric or electronic components and the first fault operation mode is selected when there is no current flow through the electric or electronic components.

The defined current limit can take into account a safety range, in particular up to at least 1 A. In this way, variations in the detection of the current value, for example, noise in the measurement signal and the like, can be taken into account. Further, it can be provided that the current value exceeds the defined current limit for a minimum duration, for example, lies above the defined current limit at least 100 ms before the second fault operation mode is selected.

Accordingly, for one, the second fault operation mode can be prevented from being selected because of an erroneous detection of the current value. Further, an unnecessary change from one fault operation mode to another can be reduced or prevented.

As described, any suitable method or method steps which are suitable for bringing the electric machine into a safe state or operating it in such a safe state can be carried out as fault operation modes in principle. According to an embodiment of the method, freewheeling can be implemented as first fault operation mode and/or an active short circuit mode can be implemented as second fault operation mode. In other words, freewheeling is selected as fault operation mode when the detected current value lies below the defined current limit. The freewheeling state may also be referred to as inverter gate or 6 switch open or 6SO. In the freewheeling state, therefore, a control device associated with the electric machine, for example, an inverter, is controlled in such a way that the switching devices of the inverter are all open.

The second fault operation mode described above can be implemented as active short circuit mode, i.e., the switching devices of the electric machine associated with the control device, for example, an electric machine connected to the inverter, are closed in such a way that a short circuit of the electric machine is initiated and a voltage induced by the operation of the electric machine is negated. For example, three of the typically six switching devices of a so-called B6 bridge can be closed for the active short circuit mode. In this case, for example, the so-called high-side or low-side switching devices can be closed.

The above-described choice of fault operation modes, namely, the choice of freewheeling below the defined current limit and the choice of active short circuit mode above the current limit, ensures that the safe state of the electric machine is achieved by the respective suitable fault operation mode. The control device, particularly the inverter, can accordingly be operated in freewheel for as long as is permitted by the electric machine in the actual driving situation.

If the operation of the electric machine results in a current flowing through the electric or electronic component, particularly above the current limit, freewheel can be changed to active short circuit mode. The current flow is caused in particular by an induced voltage which depends on further parameters of the electric machine, particularly on the speed of the rotor of the electric machine. Accordingly, by detecting the current value, the operating point up to which freewheeling can be made use of in an advantageous manner is determined as accurately as possible. If the flow of current is determined by exceeding the defined current limit, the active short circuit mode can be changed to in order to prevent damage to the control device or other electric or electronic components.

In this respect, the fact that freewheeling, particularly in the range of comparatively low speeds of the electric machine, can be implemented continuously can be made use of an advantageous manner. When the electric machine changes to an operating range in which the freewheeling has negative secondary effects, the active short circuit mode can be switched to. This simultaneously makes use of the fact that the weaknesses of the active short circuit mode show up precisely in that operating range that can be covered by the freewheeling within the framework of the present invention.

In other words, the active short circuit mode is used precisely when freewheeling would lead to unfavorable secondary effects and the active short circuit mode exhibits its strengths in the operating range associated with it. Since the detected current value can be determined as indicator for the transition between operating ranges, namely, by any definition of the defined current limit, the use of the active short circuit mode in an unfavorable operating range, for example, at comparatively low speeds, can be prevented. Therefore, uncomfortable conditions, for example, comparatively strong braking torques, can be substantially prevented in the active short circuit mode. Accordingly, above the defined current limit, i.e., when the active short circuit mode is in use, comparatively low torques are generated so that the comfort of the user or users is not compromised in the safe operating condition of the electric machine. Further, the electric machine can also not be thermally overloaded in the safe state because the freewheel is implemented at comparatively low speeds so that the thermal load on the electric machine is comparatively minor. This may possibly contribute to a less complex design of the electric machine so that a savings in cost can be realized.

As has already been described, the current value can be detected at any suitable electric or electronic component associated with the electric machine. The current value can advantageously be detected at at least one power diode of an inverter. As described, the flow of current through the power diode or through a plurality of power diodes can be monitored, and the first fault operation mode can be replaced by the second fault operation mode when there is a flow of current. In other words, when a current value indicating a flow of current through the power diode is reliably detected, freewheeling can be switched to the active short circuit mode. In the event of a subsequent operating mode in which no current flows through the power diode, the first fault operation mode can be switched back to. As has already been described, a safety range can be defined or the current limit can take into account a safety range so that a flow of current through the power diode is not detected until a determined current value or a defined current limit or a value exceeding a certain minimum duration is detected.

According to another configuration of the method, it can be provided that the second fault operation mode is selected when there is an error in the detection of the current value. For example, in case of an error or outage of a sensor required for detecting the current value, it can be determined that the second fault operation mode is always selected in case of such an error. In other words, the active short circuit mode can be preferred in case of failure of the detection of the current value, since the active short circuit mode can ensure the safe operation of the electric machine over the entire operating range without risking significant damage to individual components.

In addition, one aspect of the invention is directed to a control device for controlling an operation of an electric machine of a motor vehicle, which control device is adapted to implement the described method. The invention is further directed to a motor vehicle comprising such a control device. All of the advantages, details and features which have been described in relation to the method are completely transferable to the control device and the motor vehicle.

BRIEF DESCRIPTION OF THE DRAWINGS

The invention will be described in the following based on embodiment examples referring to the figures. The figures are schematic depictions and show.

DETAILED DESCRIPTION OF THE PRESENTLY PREFERRED EMBODIMENTS

Figure 1:
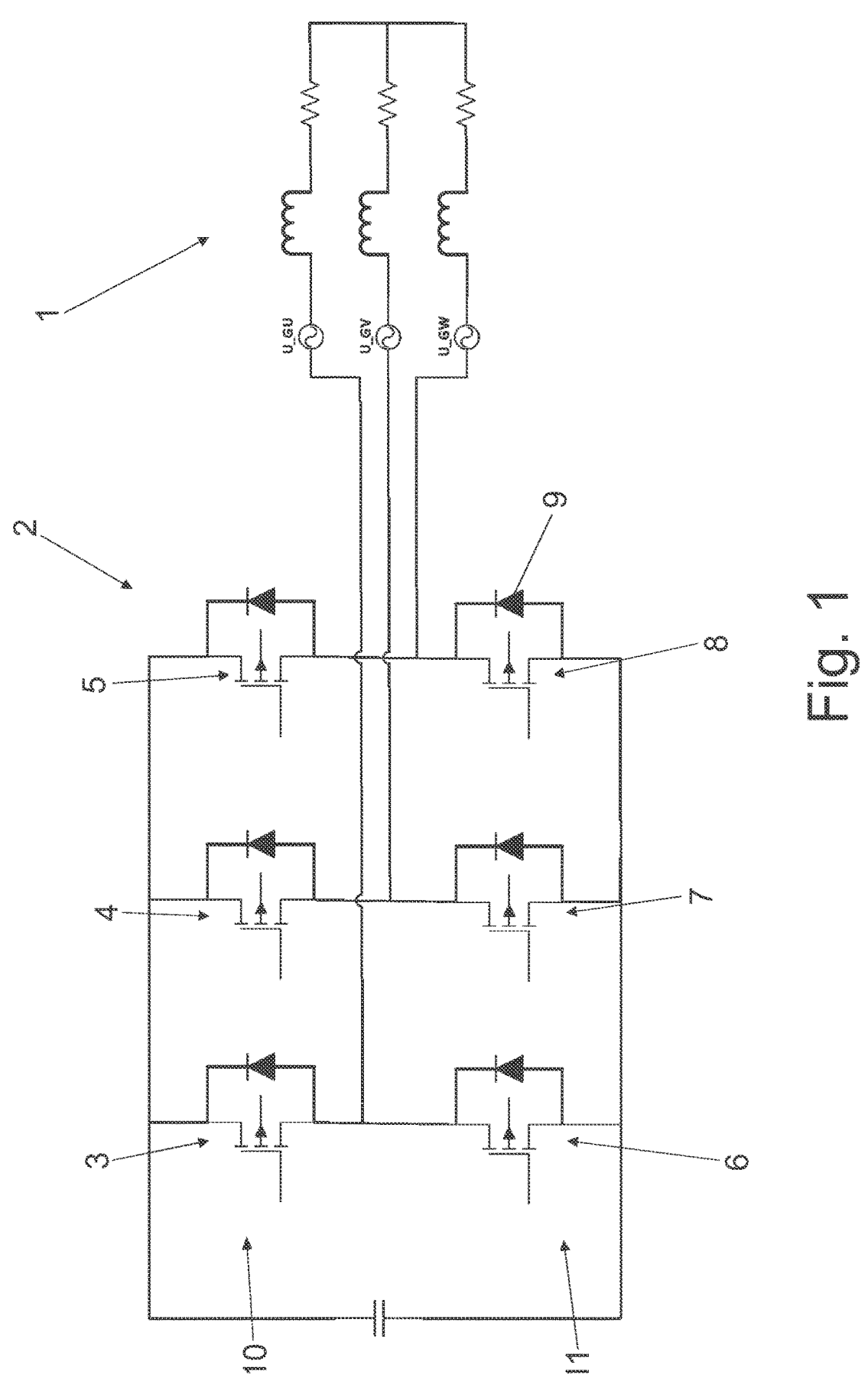
FIG. 1 is a section of a schematic wiring diagram of an electric machine of a motor vehicle.

FIG. 1 shows a section of a schematic wiring diagram for an electric machine 1 of a motor vehicle which is not shown in more detail. An inverter 2, which can form a component part of a control device, is associated with the electric machine 1. In addition to the inverter 2, a separate control device may also be provided. The control device can be formed to implement the method described in the following.

The inverter 2 has a plurality of switching devices 3-8, each of which can have a power diode 9. The switching devices 3-8 can be grouped into a first group 10 and a second group 11, which may also be referred to as high-side switches and low-side switches. The basic control of the electric machine 1 by the inverter 2 is well known from the prior art and is therefore not described in more detail.

A detection device, not shown in more detail, is provided for implementing the method. The detection device is provided for detecting a current flow through the power diodes 9 or through at least one power diode 9. In particular, a current value describing the flow of current through the power diodes 9 can be detected. The detection of the current value can be carried out for an individual power diode 9 or for all of the power diodes 9 or for any combination of power diodes 9.

Figure 2:
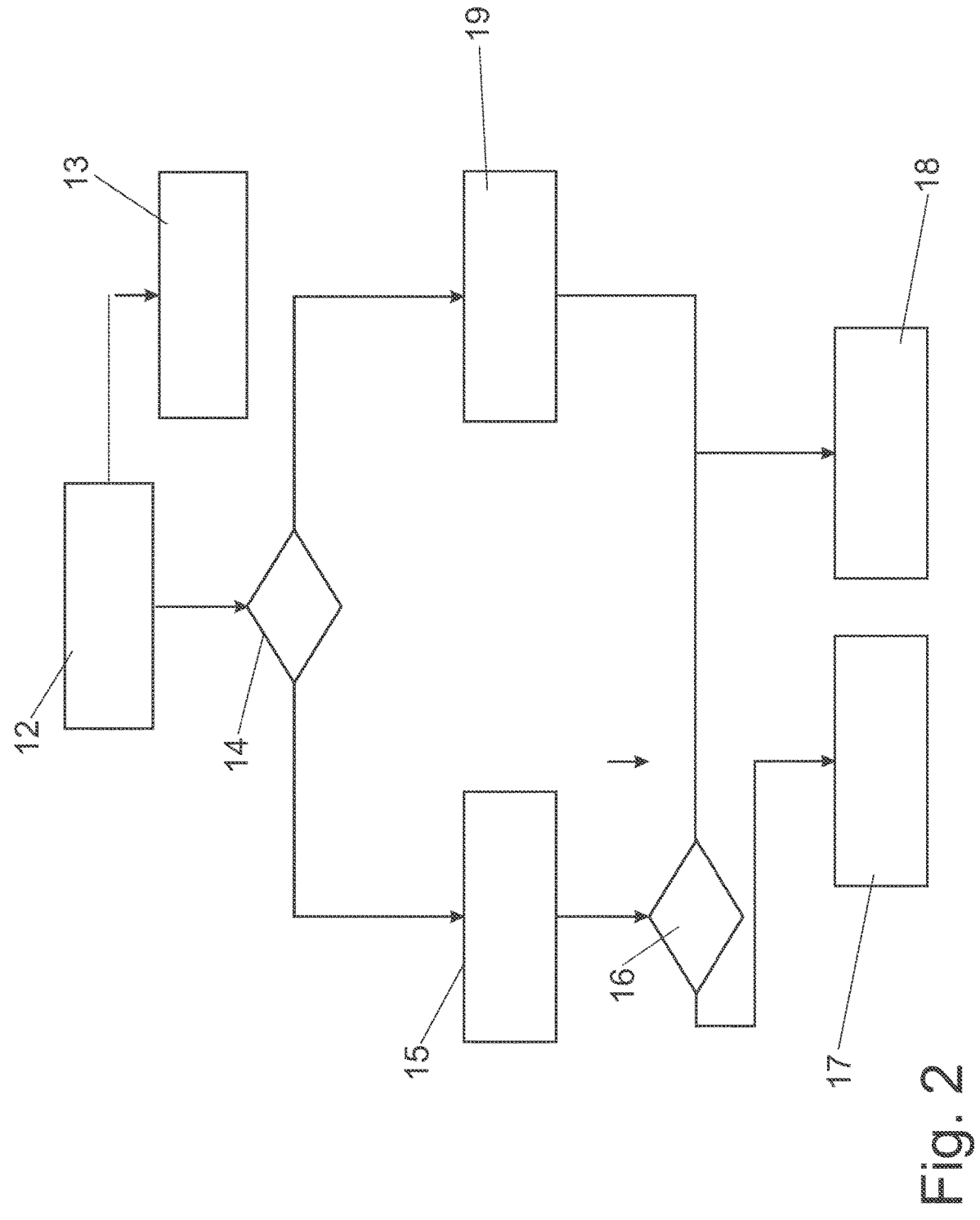
FIG. 2 is a flow chart of a method for the operation of an electric machine of a motor vehicle.

FIG. 2 schematically shows an exemplary sequence of the described method for controlling the operation of the electric machine 1. By way of example, the method starts at box 12 in which a fault detection can be carried out, for example, in the course of a safety routine of the motor vehicle or of the electric machine 1 and of the control device associated with the latter. Optionally, a classification of the fault can be carried out in box 12 and, depending on the type of fault, the flow can proceed to box 13 in which a freewheeling state or freewheeling mode of the inverter 2 can be can be directly requested.

If checking in box 12 shows that the electric machine 1 should be changed to a safe state, box 12 can flow to box 14 in which it is checked whether the detection device which, as described above, detects the value of the current through the power diodes 9 or the at least one power diode 9 is functional or not. If checking in box 14 shows that the detection device is functional, box 14 flows to box 15 in which the current value is detected. The detected current value can subsequently be compared in box 16 with a defined current limit. The current limit can ultimately be defined in any number of ways. In particular, there can be a threshold beyond which there is a flow of current through the at least one power diode 9. In other words, a safety range can be taken into account in which a noise or interference in the measurement signal can be taken into account.

If the detected current value lies below the defined current limit, box 16 flows to box 17 in which a first fault operation mode is implemented. A freewheeling state or a freewheeling mode in which the switching devices 3-8 are open can advantageously be realized as first fault operation mode. Accordingly, the freewheeling can also be referred to as inverter gate or 6-switch-open or 6SO. Depending on the operating point of the electric machine 1, for example, the speed of the rotor of the electric machine 1, and further parameters of the electric machine 1 or a component associated with it, for example, the induced voltage, the temperature or the voltage of an energy storage of the motor vehicle, a flow of current can take place through the power diodes 9 due to the induced voltage. As has been described, this current flow is monitored by the detection of the current value by the detection device. Accordingly, the freewheeling can be used as fault operation mode until the detected current value exceeds or adopts the defined current limit.

If the detected current value lies above the defined current limit, box 16 flows to box 18 in which a second fault operation mode is selected. The second fault operation mode can advantageously be realized as active short circuit mode in which the switching devices 3-8 of the inverter 2 are controlled in such a way that there is an active short circuit at the electric machine 1. Therefore, the induced voltage due to the speed of the rotor of the electric machine 1 is negated. For this purpose, usually three of the six switching devices 3-8, for example, switching devices 3-5 of the first group 10 or switching devices 6-8 of the second group 11, are opened simultaneously.

Accordingly, it is ensured that the appropriate fault operation mode is selected depending on the actual operating state of the electric machine 1. In this regard, the detection of the current value allows a less complex detection and, therefore a robust decision as to which fault operation mode is to be selected. Since the current value ultimately characterizes the operating range of the electric machine 1, the respective existing operating parameters are already taken into account. This means that the speed of the rotor, the temperature, the induced voltage and the battery voltage need not be monitored individually by individual sensors to characterize the operating range and, finally, to select the correct fault operation mode. Instead, merely the current through the at least one power diode 9 is monitored and one of at least two fault operation modes is selected depending on the detected current value. The method nevertheless allows an accurate determination of the change of operating mode so that the most efficient possible operation can be carried out.

In the present case, this makes it possible in particular to use the inverter gate at comparatively low speeds and to select the active short circuit mode at comparatively high speeds. Accordingly, it continues to be ensured that the electric machine is not thermally overloaded and that no uncontrollable braking torques can occur during the operation of the electric machine.

The selection of the fault operation mode using the described method can be carried out initially, i.e., a detection of the current value can be carried out when the fault condition is detected and the initial selection of the correct fault operation mode can already be carried out based on the described method. In further operation of the motor vehicle after detection of the fault condition, checking of the fault operation mode can be carried out continuously or in given time intervals or in an event-based manner. In particular, the current value can be detected continuously so that the freewheeling mode can be changed to active short circuit mode when the defined current limit is exceeded.

If a detection of the current value is not validated in box 14, for example, because of a disturbance in the detection device, box 14 can exit to box 19 in which the second fault operation mode is switched to whenever there is an impairment of the detection device, i.e., in states in which the current value cannot be detected. Accordingly, box 19 flows to box 18 and the method is carried out as described. In other words, insofar as a detection of the current value is not possible, the active short circuit mode is always requested or the electric machine is operated in the active short circuit mode, respectively.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for controlling an operation of an electric machine of a motor vehicle comprising:

detecting a fault condition;

bringing the electric machine by a control device into one of at least two fault operation modes in which the electric machine generates a torque below a maximum torque;

detecting a current through an electric or electronic component part associated with the electric machine; and selecting the one of at least two fault operation modes depending on a value of the detected current through the electric or electronic component part associated with the electric machine, wherein a first fault operation mode is a freewheeling implemented by opening a plurality of switching devices of an inverter, and a second fault operation mode is implemented as an active short circuit mode at least when there is an error in the detection of the current value by closing the plurality switching devices of the inverter to create an active short circuit at the electric machine.

2. The method according to claim 1, further comprising defining a current limit; and comparing the detected current value with the defined current limit, wherein selecting the one of at least two fault operation modes is made depending on a position of the detected current value in relation to the current limit.

3. The method according to claim 2, wherein the first fault operation mode is implemented when the detected current value below the defined current limit and a second fault operation mode is implemented when the detected current value above the defined current limit.

4. The method according to claim 2, wherein the defined current limit takes into account a safety range.

5. The method according to claim 4, wherein the safety range is at least 1 A.

6. The method according to claim 1, wherein the current value is detected at least one power diode of an inverter.

7. The method according to claim 1, wherein in the one of at least two fault operation modes in which the electric machine is torque-free.

8. A control device for controlling an operation of an electric machine of a motor vehicle, wherein the control device implements:

detecting a fault condition;

bringing the electric machine into one of at least two fault operation modes in which the electric machine generates a torque below a maximum torque;

detecting a current through an electric or electronic component part associated with the electric machine; and selecting the one of at least two fault operation modes depending on a value of the detected current through the electric or electronic component part associated with the electric machine, wherein a first fault operation mode is a freewheeling implemented by opening a plurality of switching devices of an inverter, and a second fault operation mode is implemented as an active short circuit mode at least when there is an error in the detection of the current value by closing the plurality switching devices of the inverter to create an active short circuit at the electric machine.

9. A motor vehicle comprising:

an electric machine; and a control device, wherein the control device implements:

detecting a fault condition;

bringing the electric machine into one of at least two fault operation modes in which the electric machine generates a torque below a maximum torque;

detecting a current through an electric or electronic component part associated with the electric machine; and selecting the one of at least two fault operation modes depending on a value of the detected current through the electric or electronic component part associated with the electric machine, wherein a first fault operation mode is a freewheeling implemented by opening a plurality of switching devices of an inverter, and a second fault operation mode is implemented as an active short circuit mode at least when there is an error in the detection of the current value by closing the plurality switching devices of the inverter to create an active short circuit at the electric machine.

\*     \*     \*     \*     \*